(12) United States Patent
Jacobson et al.

(10) Patent No.: US 7,500,014 B1
(45) Date of Patent: Mar. 3, 2009

(54) NETWORK LINK STATE MIRRORING

(75) Inventors: David Jacobson, Durham, NC (US);
Roopesh R. Varier, Sunnyvale, CA (US);
Michael J. Quinn, Campbell, CA (US)

(73) Assignee: Packeteer, Inc., Sunnyvale, CA (US)

( * ) Notice: Subject to any disclaimer, the term of this patent is extended or adjusted under 35 U.S.C. 154(b) by 888 days.

(21) Appl. No.: 10/431,010

(22) Filed: May 7, 2003

(51) Int. Cl.
*G06F 15/173* (2006.01)

(52) U.S. Cl. .................. 709/239; 709/240; 709/242

(58) Field of Classification Search ............ 709/242, 709/239, 240
See application file for complete search history.

(56) References Cited

U.S. PATENT DOCUMENTS

| | | | |
|---|---|---|---|
| 6,188,675 B1 * | 2/2001 | Casper et al. | 370/254 |
| 6,633,544 B1 * | 10/2003 | Rexford et al. | 370/238 |
| 6,658,595 B1 * | 12/2003 | Thamattoor | 714/11 |
| 6,823,395 B1 * | 11/2004 | Adolfsson | 709/242 |
| 7,120,111 B2 * | 10/2006 | Hosler et al. | 370/217 |
| 7,155,632 B2 * | 12/2006 | Vasavada | 714/4 |
| 2003/0084371 A1 * | 5/2003 | Mongazon-Cazavet et al. | 714/13 |
| 2004/0157557 A1 * | 8/2004 | Barnett et al. | 455/41.2 |
| 2005/0249186 A1 * | 11/2005 | Kelsey et al. | 370/349 |

* cited by examiner

*Primary Examiner*—John Follansbee
*Assistant Examiner*—Nghi V Tran
(74) *Attorney, Agent, or Firm*—Baker Botts L.L.P.

(57) ABSTRACT

Methods, apparatuses and systems allowing for network link state mirroring in intermediate network devices. A variety of intermediate network devices disposed between two network devices are operationally transparent to the two network devices. For example, a bandwidth management device disposed between a gateway router and a LAN hub or switch, is operationally transparent, to both network devices since the bandwidth management device, pacing or otherwise controlling packet flows, does not alter the essential routing or switching functions of the devices. The present invention promotes or enhances this operational transparency by mirroring the link state detected at a first network interface on other network interfaces. This functionality is highly useful in today's network topologies where information regarding failure of a link can be used to re-route traffic, alert a network administrator, and the like.

20 Claims, 7 Drawing Sheets

NETWORK LINK STATE MIRRORING

CROSS-REFERENCE TO RELATED APPLICATIONS

This application makes reference to the following commonly owned U.S. patent applications and patents, which are incorporated herein by reference in their entirety for all purposes:

U.S. patent application Ser. No. 08/762,828 now U.S. Pat. No. 5,802,106 in the name of Robert L. Packer, entitled "Method for Rapid Data Rate Detection in a Packet Communication Environment Without Data Rate Supervision;"

U.S. patent application Ser. No. 08/970,693 now U.S. Pat. No. 6,018,516, in the name of Robert L. Packer, entitled "Method for Minimizing Unneeded Retransmission of Packets in a Packet Communication Environment Supporting a Plurality of Data Link Rates;"

U.S. patent application Ser. No. 08/742,994 now U.S. Pat. No. 6,038,216, in the name of Robert L. Packer, entitled "Method for Explicit Data Rate Control in a Packet Communication Environment without Data Rate Supervision;"

U.S. patent application Ser. No. 09/977,642 now U.S. Pat. No. 6,046,980, in the name of Robert L. Packer, entitled "System for Managing Flow Bandwidth Utilization at Network, Transport and Application Layers in Store and Forward Network;"

U.S. patent application Ser. No. 09/106,924 now U.S. Pat. No. 6,115,357, in the name of Robert L. Packer and Brett D. Galloway, entitled "Method for Pacing Data Flow in a Packet-based Network;"

U.S. patent application Ser. No. 09/046,776 now U.S. Pat. No. 6,205,120, in the name of Robert L. Packer and Guy Riddle, entitled "Method for Transparently Determining and Setting an Optimal Minimum Required TCP Window Size;"

U.S. patent application Ser. No. 09/479,356 now U.S. Pat. No. 6,285,658, in the name of Robert L. Packer, entitled "System for Managing Flow Bandwidth Utilization at Network, Transport and Application Layers in Store and Forward Network;"

U.S. patent application Ser. No. 09/198,090 now U.S. Pat. No. 6,412,000, in the name of Guy Riddle and Robert L. Packer, entitled "Method for Automatically Classifying Traffic in a Packet Communications Network;"

U.S. patent application Ser. No. 09/198,051, in the name of Guy Riddle, entitled "Method for Automatically Determining a Traffic Policy in a Packet Communications Network;"

U.S. patent application Ser. No. 09/206,772, in the name of Robert L. Packer, To Brett D. Galloway and Ted Thi, entitled "Method for Data Rate Control for Heterogeneous or Peer Internetworking;"

U.S. patent application Ser. No. 09/966,538, in the name of Guy Riddle, entitled "Dynamic Partitioning of Network Resources;"

U.S. patent application Ser. No. 10/039,992, in the Michael J. Quinn and Mary L. Laier, entitled "Method and Apparatus for Fast Lookup of Related Classification Entities in a Tree-Ordered Classification Hierarchy;"

U.S. patent application Ser. No. 10/015,826, in the name of Guy Riddle, entitled "Dynamic Tunnel Probing in a Communications Network;"

U.S. patent application Ser. No. 10/104,238, in the name of Robert Purvy and Mark Hill, entitled "Methods and Systems Allowing for Non-Intrusive Network Management;"

U.S. patent application Ser. No. 10/108,085, in the name of Wei-Lung Lai, Jon Eric Okholm, and Michael J. Quinn, entitled "Output Scheduling Data Structure Facilitating Hierarchical Network Resource Allocation Scheme;"

U.S. patent application Ser. No. 10/155,936, in the name of Guy Riddle, Robert L. Packer and Mark Hill, entitled "Method for Automatically Classifying Traffic with Enhanced Hierarchy in a Packet Communications Network;"

U.S. patent application Ser. No. 10/177,518, in the name of Guy Riddle, entitled "Methods, Apparatuses and Systems Allowing for Progressive Network Resource Utilization Control Scheme;" and U.S. patent application Ser. No. 10/236,149, in the name of Brett Galloway and George Powers, entitled "Classification Data Structure enabling Multi-Dimensional Network Traffic Classification and Control Schemes."

FIELD OF THE INVENTION

The present invention relates to computer networks and, more particularly, to methods, apparatuses and systems directed to replicating the state of a link on a connection or interface detected by an intermediate network device on any other connections to which the network device has access. In certain embodiments, the present invention enables the intermediate network device to become transparent and provide information of the state of the network as it detects it to the other devices connected to it.

BACKGROUND OF THE INVENTION

Computer networks includes a vast array of interconnected components or network devices (e.g., routers, switches, firewalls, proxy servers, bridges, etc.) for implementing, and/or enhancing the performance of, the network function of transmitting data between end systems. Many such network devices also include control logic for responding to the changes in network state, such as handling situations where a neighboring interconnected device fails and/or the link connecting the two devices goes down for a period of time. For example, a router having several interfaces can adjust its routing functionality in a failover mode to account for a failed, adjacent router or link connected to a given interface.

As one skilled in the art is readily aware, a variety of network devices can be disposed in the communications path between the routers, switches, hubs, bridges, and other network devices, such as bandwidth management devices, proxy caches, and the like. While such intermediate devices do not alter the essential function of the routers and other network devices, the presence of these intermediate systems does interrupt their view of network state and, therefore, affects any functionality responsive to changes in network state, such as the failover measures employed by a router. For example and with reference to FIG. 1, the presence of intermediate device 30 prevents network device 40, such as a LAN switch, from receiving the same feedback it would have otherwise received when network device 22, or the link associated with it, fails. For example, if network device 22 completely fails, network device 40 does not receive the direct feedback, since intermediate network device 30 remains powered and operational. This circumstance prevents network device 40, or perhaps end systems connected to network device 40, from detecting the failover and implementing failover procedures, if any.

As an illustrative example, a router disposed at the edge of a local area network essentially assumes that it has a route to all the hosts on that network as long as it detects that its interface on to the local area network is accessing an active link. Therefore, in a configuration with redundant routers, it is often important that a router be able to detect when its LAN interface goes down, so that it knows when it has lost any part of the path between it and the local hosts that are attached to the LAN.

In a typical LAN, bridges/switches are the main device between the routers and a host. Generally, as long as the bridge/switch is active, the link between the router and the bridge remains active, guaranteeing that the router has a path to all hosts on the LAN. This guarantee is often achieved by using a multiport bridge/switch and providing at least two routes from the bridge/switch to all hosts. So as long as the router sees its LAN interface is active it can assume that it has a path to the local hosts that will survive any single failure. If the bridge/switch fails, the link to the router goes down and the router stops WAN advertisements of any route to the local hosts. This change causes WAN traffic to use the other router which continues to advertise its route to the local hosts.

As discussed above, the problem introduced by bandwidth management devices, such as the PacketShaper® offered by Packeteer, Inc. of Cupertino, Calif., is that it is often be a transparent device sitting between a bridge/switch and a router. However, if the interface with the bridge goes down, the link between the bandwidth management device and the router stays up, preventing the router from determining that it has lost the path to the local hosts.

In light of the foregoing, a need in the art exists for methods, apparatuses and systems that allow an intermediate network device to mirror network state detected on a first network interface on other connections to which it has access. Embodiments of the present invention substantially fulfill this need.

SUMMARY OF THE INVENTION

The present invention provides methods, apparatuses and systems allowing for network link state mirroring in intermediate network devices. A variety of intermediate network devices disposed between two network devices are operationally transparent to the two network devices. For example, a bandwidth management device disposed between a gateway router and a LAN hub or switch, is operationally transparent, to both network devices since the bandwidth management device, pacing or otherwise controlling packet flows, does not alter the essential routing or switching functions of the devices. The present invention promotes or enhances this operational transparency by mirroring the link state detected at a first network interface on other network interfaces. This functionality is highly useful in today's network topologies where information regarding failure of a link can be used to re-route traffic, alert a network administrator, and the like.

DESCRIPTION OF PREFERRED EMBODIMENTS

Figure 1:
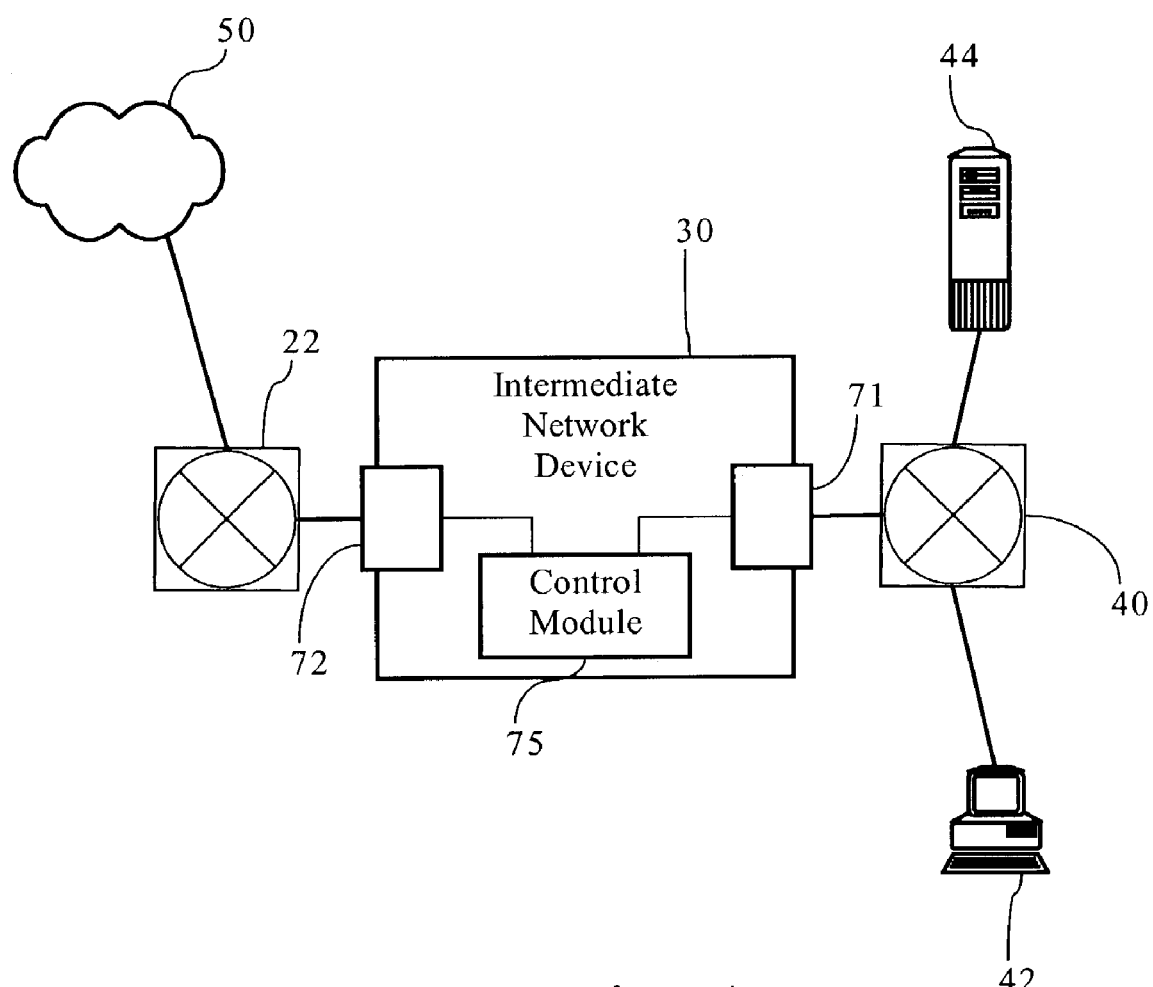
FIG. 1 is a functional block diagram illustrating a network environment in which the link state mirroring functionality according to an embodiment of the present invention can operate.
Figure 2:
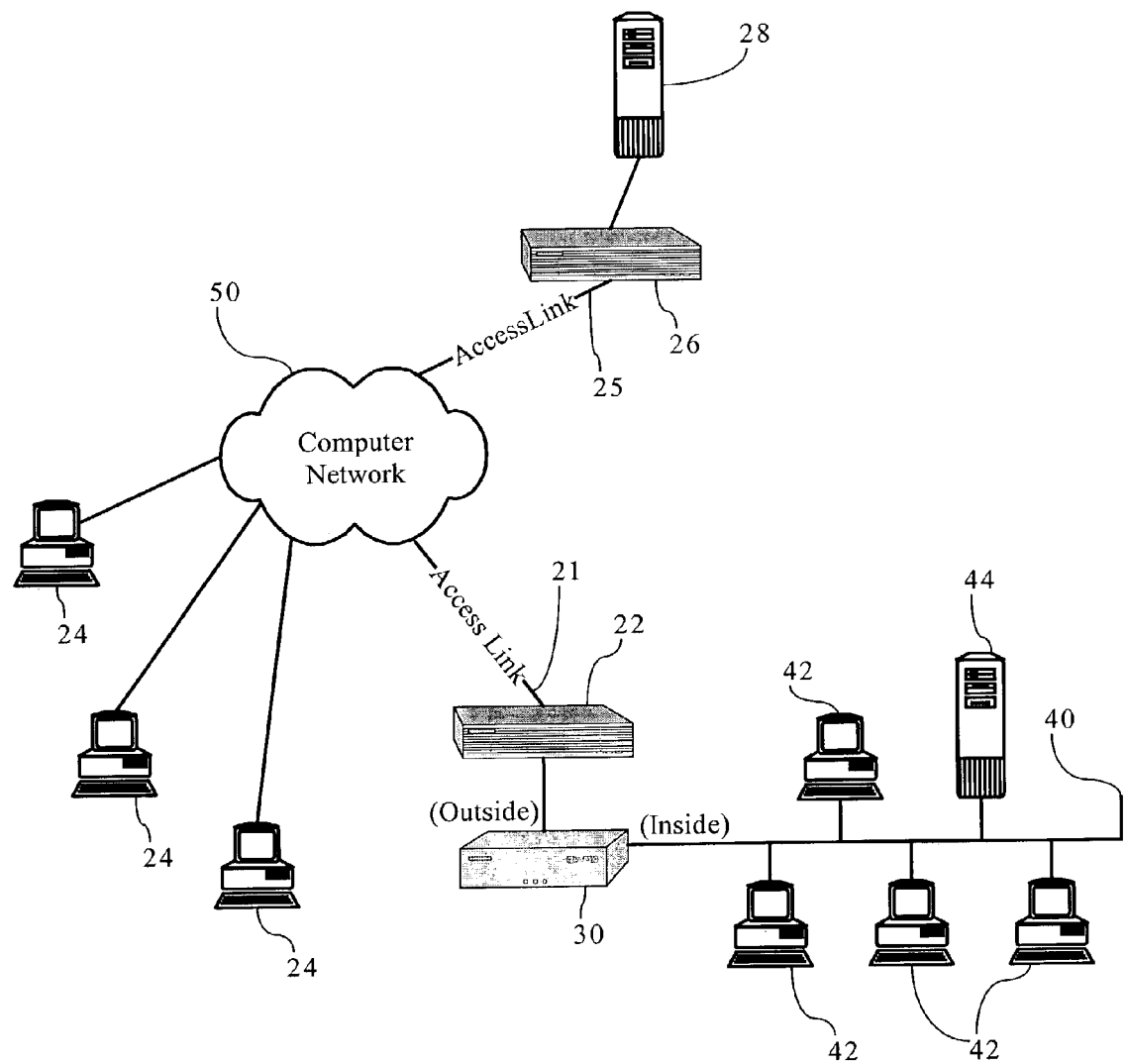
FIG. 2 is a functional block diagram illustrating a computer network environment including a bandwidth management device according to an embodiment of the present invention.

FIG. 1 illustrates a basic environment in which an embodiment of the present invention operates. FIG. 1 shows a first network device 40, such as a hub, switch or router, interconnecting two end-systems (here, client computer 42 and server 44). FIG. 1 also provides a second network device 22, such as a router, operably connected to network cloud 50, such as an open, wide-area network. As FIG. 1 shows, intermediate network device 30 comprises control module 75, and first and second network interfaces 71, 72, which operably connect intermediate device 30 to the communications path between first network device 40 and second network device 22. Control module 75 generally refers to the functionality implemented by intermediate network device 30. In one embodiment, control module 75 is a combination of hardware and software, such as a central processing unit, memory, a system bus, an operating system and an application, such as a firewall, proxy, or bandwidth management application. In one embodiment, first and second network interfaces 71, 72 are implemented as a combination of hardware and software, such as network interface cards and associated software drivers. FIG. 2 illustrates an operating environment where intermediate network device 30 is a bandwidth management device. However, as discussed in more detail below, intermediate network device 30 may be a variety of network devices, such as a router, a proxy, a web services network gateway or broker, etc. In addition, the first and second network interfaces can be wired network interfaces, such as Ethernet interfaces, or wireless network interfaces, such as 802.11, Blue-Tooth, satellite-based interfaces, and the like.

A. Link State Mirroring

As discussed herein, intermediate network device 30 is operative to mirror the link state detected at a first network interface 72, for example, at least a second network interface 71 to allow functionality associated with network device 40, for example, to detect the link state, such as a failure of router 22, and take appropriate action. When a network device fails and, hence, the link between that network device and intermediate device 30 goes down, intermediate network device 30 can bring the opposite or corresponding link down in a number of ways. In one embodiment, when intermediate network device 30 detects at network interface 72 (for example) that network device 22 has failed, control module 75 can make the appropriate system calls to physically shutdown the hardware implementing network interface 71 to mirror the link state between network interface 72 and network device 22. When the link between network device 22 and intermediate device 30 becomes operational, control module 75 can reactivate network interface 72. As one skilled in the art will recognize, various physical and link layer mechanisms can be accessed to determine link state and to bring down the network interface 71 and/or 72 in response to detected changes in the link state.

Link state mirroring may also be implemented in software without bringing down the opposing network interface. For example, control module 75 can be configured to ignore all messages received at network interface 71, while network device 22, or the link associated with it, remains down. In one embodiment, control module 75 can be configured to ignore all packets, except those packets addressed to intermediate network device 30, such as ICMP or SNMP requests. In either embodiment, control module 75 can also be configured to notify a network administrator of the detected failure of network device 22 or 40. For example, the failure of a network device can cause control module 75 to transmit an SNMP trap or other suitable message to a network management platform.

B. Integration of Link State Mirroring and Bandwidth Management Functionality As discussed above, intermediate network device 30, in one embodiment, can be a bandwidth management device operative to manage data flows traversing access link 21. The above-identified, commonly-owned patents and patent applications disclose the functionality and operation of bandwidth management devices. FIG. 2 sets forth a packet-based computer network environment including a bandwidth management device 30. As FIG. 2 shows, local area computer network 40 interconnects several TCP/IP end systems, including client devices 42 and server device 44, and provides access to resources operably connected to computer network 50 via router 22 and access link 21. Access link 21 is a physical and/or logical connection between two networks, such as computer network 50 and local area network 40. Server 28 is a TCP end system connected to computer network 50 through router 26 and access link 25. Client devices 24 are additional TCP end systems operably connected to computer network 50 by any suitable means, such as through an Internet Services Provider (ISP). The computer network environment, including computer network 50 is a packet-based communications environment, employing TCP/IP protocols, and/or other suitable protocols, and has a plurality of interconnected digital packet transmission stations or routing nodes. Bandwidth management device 30 is provided between router 22 and local area computer network 40. Bandwidth management device 30 is operative to classify data flows and, depending on the classification, enforce respective bandwidth utilization controls on the data flows to control bandwidth utilization across and optimize network application performance across access link 21.

Figure 3:
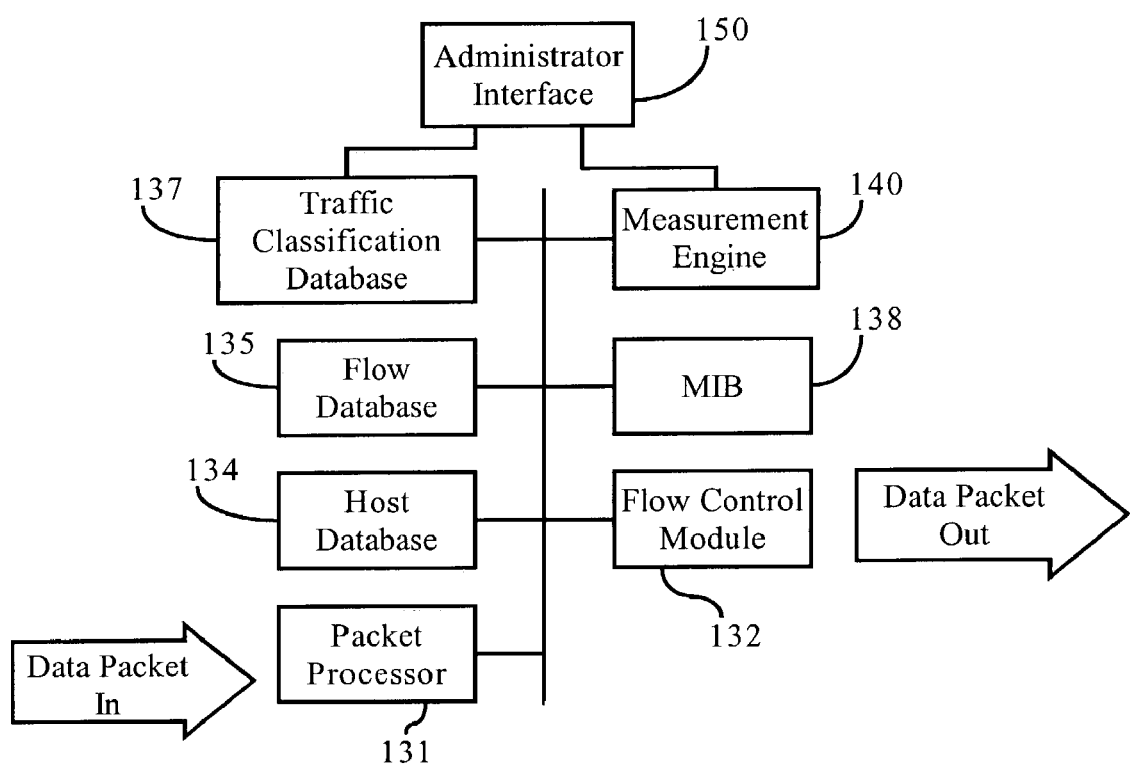
FIG. 3 is a functional block diagram setting forth the functionality in a bandwidth management device according to an embodiment of the present invention.

FIG. 3 is a block diagram illustrating functionality, according to one embodiment of the present invention, included in bandwidth management device 30. In one embodiment, bandwidth management device 30 comprises packet processor 131, flow control module 132, measurement engine 140, traffic classification engine 137, management information base (MIB) 138, and administrator interface 150. Packet processor 131 is operative to detect new data flows and construct data structures including attributes characterizing the data flow. Flow control module 132 is operative to enforce bandwidth utilization controls on data flows traversing bandwidth management device 30. Traffic classification engine 137 is operative to analyze data flow attributes and identify traffic classes corresponding to the data flows, as discussed more fully below. In one embodiment, traffic classification engine 137 stores traffic classes associated with data flows encountered during operation of bandwidth management device 30, as well as manually created traffic classes and a hierarchical traffic class structure, if any, configured by a network administrator. In one embodiment, traffic classification engine 137 stores traffic classes, in association with pointers to bandwidth utilization controls or pointers to data structures defining such bandwidth utilization controls. Management information base 138 is a database of standard and extended network objects related to the operation of bandwidth management device 30. Measurement engine 140 maintains measurement data relating to operation of bandwidth management device 30 to allow for monitoring of bandwidth utilization across access link 21 with respect to a plurality of bandwidth utilization and other network statistics on an aggregate and/or per-traffic-class level.

Administrator interface 150 facilitates the configuration of bandwidth management device 30 to adjust or change operational and configuration parameters associated with the device. For example, administrator interface 150 allows administrators to select identified traffic classes and associate them with bandwidth utilization controls, such as a partition, as well as other controls. Administrator interface 150 also displays various views associated with a hierarchical traffic classification scheme and allows administrators to configure or revise the hierarchical traffic classification scheme as discussed more fully below. Administrator interface 150 can be a command line interface or a graphical user interface accessible, for example, through a conventional browser on client device 42.

In one embodiment, the operation of the functionality described above can be controlled or affected by changing the status of certain fields or variables associated with the links or interfaces 71, 72. Specifically, in one embodiment, the links between bandwidth management device 30 and router 22 and network 40, respectively, are each represented as a software object comprising a link status attribute. When either link goes down, a link status demon, as discussed more fully below, is invoked to operate on the link objects to change the link status attribute values. Operation of the bandwidth management functionality described herein, in one embodiment, is responsive to changes in the link status attributes corresponding to the network interfaces and connections. For example, in one embodiment, if either link status attribute is down, the bandwidth management functionality essentially pauses until the failed link becomes operative.

Figure 5:
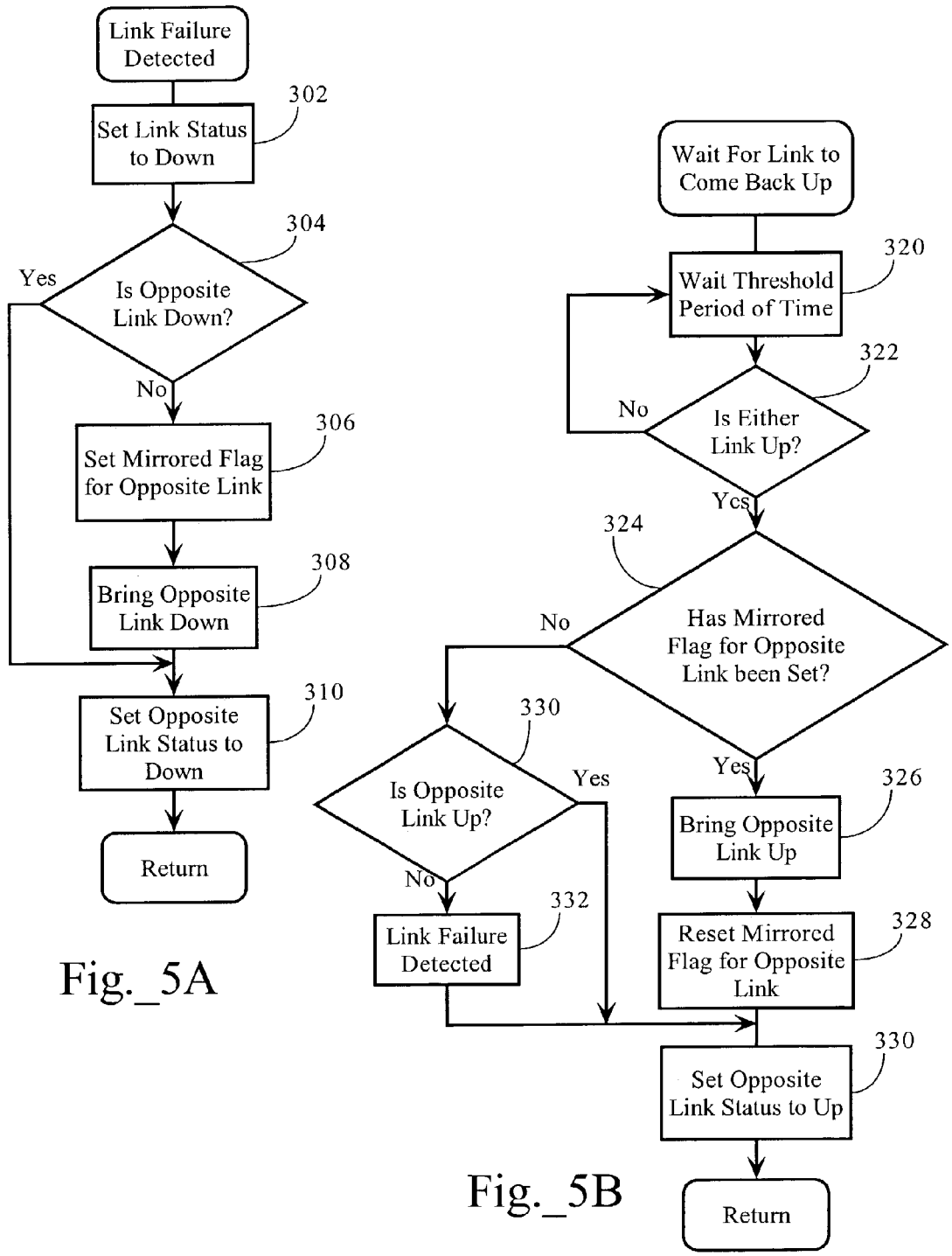
FIGS. 5A and 5B are flow chart diagrams illustrating methods directed to operation of a link state demon according to an embodiment of the present invention.

As discussed above, in one embodiment, bandwidth management device 30 includes a link status demon that monitors the status of the links associated with router 22 and network 40. The link status demon monitors the status of the links and is invoked when at least one of the links goes down. FIGS. 5A and 5B illustrates methods, according to an embodiment of the present invention, associated with operation of the link status demon. In one embodiment, when a given link goes down, the link status demon operates to bring the opposite link down and then monitors the failed link to detect when it comes back up.

As FIG. 5A illustrates, when the link status demon is invoked in response to a failed link, it sets the link status corresponding to the failed link to "down" (302). As discussed above, in one embodiment, each link is represented by an object including a link status attribute and a mirrored status flag. The link status attribute characterizes the status of the link (e.g., either up or down), while the mirrored status attribute characterizes whether the corresponding link has been set to mirror a failed opposite link. As discussed above, changing the link status attribute to down affects operation of the bandwidth management functionality described herein. The link status demon then determines whether the opposite link is down (304). If the opposite link is also down, link status demon sets the opposite link status attribute to down (310). If the opposite link is up, the link status demon sets the mirrored status flag for the opposite link (306), brings the opposite link down (308), and sets the opposite link status attribute to down (310). The link status demon then switches to a monitoring mode to detect when the failed link comes back up.

As FIG. 5B illustrates, the link status demon waits a threshold period of time (320) and then polls the network interfaces 71, 72 to determine whether either link is up (322). As discussed above, in one embodiment, either one or both of the links may be down by failure of the connected device(s). In addition, where only one connected network device fails, the other link has been brought down by the link status demon. If neither link comes back up, the link status demon waits an additional threshold period of time before it rechecks the status of the links. If one of the links comes back up, the link status demon determines whether the mirrored status flag for the opposite link has been set (324). If so (meaning that it was brought down to mirror the state of the opposing link), link status demon brings the opposite link up (326), resets the mirrored status flag (328), and sets the opposite link status attribute to "up" (330). Otherwise, if the mirrored status flag for the opposite link has not been set (324) (e.g., indicating that the link is down through failure of the connected network device), link status demon again checks the status of the opposite link (330). If the opposite link is up, the link status demon sets the sets the opposite link status attribute to "up" (330), allowing the bandwidth management functionality to resume operation. Otherwise, if the opposite link is down, the link status demon executes the process illustrated in FIG. 5A.

B.1. Packet Processing

In one embodiment, when packet processor 131 encounters a new data flow it stores the source and destination IP addresses contained in the packet headers in host database 134. Packet processor 131 further constructs a control block object including attributes characterizing a specific flow between two end systems. In one embodiment, packet processor 131 writes data flow attributes having variably-sized strings (e.g., URLs, host names, etc.) to a dynamic memory pool. The flow specification object attributes contain attribute identifiers having fixed sizes (e.g., IP addresses, port numbers, service IDs, protocol IDs, etc.), as well as the pointers to the corresponding attributes stored in the dynamic memory pool. Packet processor 131, in one embodiment, reserves memory space in the dynamic memory pool for storing such variably-sized attribute information as flows traverse bandwidth management device 30. Packet processor 131 writes the attributes in the dynamic memory pool and, if it runs out of memory, reports to the management information base that it ran out of memory and returns the service type ID (see below) identified at the point when memory ran out.

In one embodiment, a control block object contains a flow specification object including such attributes as pointers to the "inside" and "outside" IP addresses in host database 134, as well as other flow specification parameters, such as inside and outside port numbers, service type (see below), protocol type and other parameters characterizing the data flow. In one embodiment, such parameters can include information gleaned from examination of data within layers 2 through 7 of the OSI reference model. U.S. Pat. No. 6,046,980, incorporated by reference herein, discloses classification of data flows for use in a packet-based communications environment. FIG. 1 illustrates the concept associated with inside and outside addresses. As discussed above, in one embodiment, a flow specification object includes an "inside" and "outside" address relative to bandwidth management device 30. See FIG. 1. For a TCP packet, packet processor 131 can compute the inside and outside addresses based on the source and destination addresses of the packet and the direction of the packet flow.

In one embodiment, packet processor 131 creates and stores control block objects corresponding to data flows in flow database 135. In one embodiment, control block object attributes include a pointer to a corresponding flow specification object, as well as other flow state parameters, such as TCP connection status, timing of last packets in the inbound and outbound directions, speed information, apparent round trip time, etc. Control block object attributes further include at least one traffic class identifier (or pointer(s) thereto) associated with the data flow, as well as policy parameters (or pointers thereto) corresponding to the identified traffic class. In one embodiment, control block objects further include a list of traffic classes for which measurement data associated with the data flow should be logged. In one embodiment, to facilitate association of an existing control block object to subsequent packets associated with a data flow or connection, flow database 135 further maintains a control block hash table including a key comprising a hashed value computed from a string comprising the inside IP address, outside IP address, inside port number, outside port number, and protocol type (e.g., TCP, UDP, etc.) associated with a pointer to the corresponding control block object. According to this embodiment, to identify whether a control block object exists for a given data flow, packet processor 131 hashes the values identified above and scans the hash table for a matching entry. If one exists, packet processor 131 associates the pointer to the corresponding control block object with the data flow.

To allow for identification of service types (e.g., FTP, HTTP, etc.), packet processor 131, in one embodiment, is supported by one to a plurality of service identification tables in a relational database that allow for identification of a particular service type (e.g., application, protocol, etc.) based on the attributes of a particular data flow. In one embodiment, a services table including the following fields: 1) service ID, 2) service aggregate (if any), 3) name of service, 4) service attributes (e.g., port number, outside IP address, etc.), and 5) default bandwidth management policy. A service aggregate encompasses a combination of individual services (each including different matching criteria, such as different port numbers, etc.) corresponding to the service aggregate. When bandwidth management device 30 encounters a new flow, packet processor 131 analyzes the data flow against the service attributes in the services table to identify a service ID corresponding to the flow. In one embodiment, packet processor 131 may identify more than one service ID associated with the flow. In this instance, packet processor 131 associates the more/most specific service ID to the flow. For example, network traffic associated with a peer-to-peer file sharing service may be identified as TCP or HTTP traffic, as well as higher level traffic types such as the actual file sharing application itself (e.g., Napster, Morpheus, etc.). In this instance, packet processor associates the flow with the most specific service ID. A traffic class may be configured to include matching rules based on the service IDs in the services table. For example, a matching rule directed to HTTP traffic may simply refer to the corresponding service ID, as opposed to the individual attributes that packet processor 131 uses to initially identify the service.

In one embodiment, when packet processor 131 inspects a flow it may detect information relating to a second, subsequent flow (e.g., an initial FTP command connection being the harbinger of a subsequent data connection, etc.). Packet processor 131, in response to such flows populates a remembrance table with attributes gleaned from the first flow, such as IP addresses of the connection end points, port numbers, and the like. Packet processor 131 scans attributes of subsequent flows against the remembrance table to potentially associate the subsequent flow with the first flow and to assist in identification of the second flow.

B.2. Flow Control Module

As discussed above, flow control module 132 enforces bandwidth utilization controls (and, in some embodiments, other policies) on data flows traversing access link 21. A bandwidth utilization control for a particular data flow can comprise an aggregate control bandwidth utilization control, a per-flow bandwidth utilization control, or a combination of the two. Flow control module 132 can use any suitable functionality to enforce bandwidth utilization controls known in the art, including, but not limited to weighted fair queuing, class-based weighted fair queuing, Committed Access Rate (CAR) and "leaky bucket" techniques. Flow control module 132 may incorporate any or a subset of the TCP rate control functionality described in the cross-referenced U.S. patents and/or patent applications set forth above for controlling the rate of data flows. Bandwidth management device 30, however, can also be configured to implement a variety of different policy types, such as security policies, admission control policies, marking (diffserv, VLAN, etc.) policies, redirection policies, caching policies, transcoding policies, and network address translation (NAT) policies. Of course, one of ordinary skill in the art will recognize that other policy types can be incorporated into embodiments of the present invention.

B.2.a. Aggregate Bandwidth Utilization Control

An aggregate bandwidth utilization control operates to manage bandwidth for aggregate data flows associated with a traffic class. An aggregate bandwidth utilization control can be configured to essentially partition the available bandwidth corresponding to a given access link. For example, a partition can be configured to protect a network traffic class by guaranteeing a defined amount of bandwidth and/or Limit a network traffic class by placing a cap on the amount of bandwidth a traffic class can consume. Such partitions can be fixed or "burstable." A fixed partition allows a traffic class to use in the aggregate a defined amount of bandwidth. A fixed partition not only ensures that a specific amount of bandwidth will be available, but it also limits data flows associated with that traffic class to that same level. A burstable partition allows an aggregate traffic class to use a defined amount of bandwidth, and also allows that traffic class to access additional unused bandwidth, if needed. A cap may be placed on a burstable partition, allowing the traffic class to access up to a maximum amount of bandwidth, or the burstable partition may be allowed to potentially consume all available bandwidth across the access link. Partitions can be arranged in a hierarchy that is, partitions can contain partitions. For example, the bandwidth, or a portion of the bandwidth, available under a parent partition can be allocated among multiple child partitions. In one embodiment, at the highest level, a partition exists for all available outbound bandwidth, while another partition exists for all available inbound bandwidth across the particular access link. These partitions are then sub-dividable to form a hierarchical tree. For example, an enterprise employing static partitions may define a static partition for a PeopleSoft software application traffic class, and sub-divide this parent partition into a large burstable child partition for its human resources department and a smaller burstable child partition for the accounting department. U.S. patent application Ser. No. 10/108,085 includes a discussion of methods for implementing partitions, as well as novel solution for implementing partitions arranged in a hierarchical allocation scheme.

In one embodiment, a partition is created by selecting a traffic class and configuring a partition for it. As discussed above, configurable partition parameters include 1) minimum partition size (in bits per second); 2) whether it is burstable (that is, when this option is selected, it allows the partition to use available excess bandwidth; when the option is not selected the partition has a fixed size); and 3) maximum bandwidth to be used when the partition bursts.

B.2.b. Per-Flow Bandwidth Utilization Controls

Flow control module 132 is also operative to enforce per-flow bandwidth utilization controls on traffic across access link 21. Whereas aggregate bandwidth utilization controls (e.g., partitions, above) allow for control of aggregate data flows associated with a traffic class, per-flow bandwidth utilization controls allow for control of individual data flows. In one embodiment, flow control module 132 supports different bandwidth utilization control types, including, but not limited to, priority policies, rate policies, and discard policies. A priority policy determines how individual data flows associated with a traffic class are treated relative to data flows associated with other traffic classes. A rate policy controls the rate of data flows, for example, to smooth bursty traffic, such as HTTP traffic, in order to prevent a TCP end system from sending data packets at rates higher than access link 21 allows, thereby reducing queuing in router buffers and improving overall efficiency. U.S. patent application Ser. No. 08/742,994 now U.S. Pat. No. 6,038,216, incorporated by reference above, discloses methods and systems allowing for explicit data rate control in a packet-based network environment to improve the efficiency of data transfers. Similarly, U.S. Pat. No. 6,018,516, incorporated by reference above, methods and systems directed to minimizing unneeded retransmission of packets in a packet-based network environment. A rate policy can be configured to establish a minimum rate for each flow, allow for prioritized access to excess available bandwidth, and/or set limits on total bandwidth that the flow can consume. A discard policy causes flow control module 132 to discard or drop data packets or flows associated with a particular traffic class. Other policy types include redirection policies where an inbound request designating a particular resource, for example, is redirected to another server.

A.3. Traffic Classification

A traffic class comprises a set of matching rules or attributes allowing for logical grouping of data flows that share the same characteristic or set of characteristics—e.g., a service ID or type (see Section B.1., above), a specific application, protocol, IP address, MAC address, port, subnet, etc. In one embodiment, each traffic class has at least one attribute defining the criterion(ia) used for identifying a specific traffic class. For example, a traffic class can be defined by configuring an attribute defining a particular IP address or subnet. Of course, a particular traffic class can be defined in relation to a plurality of related and/or orthogonal data flow attributes. U.S. Pat. No. 6,412,000 and U.S. patent application Ser. No. 10/039,992 describe some of the data flow attributes that may be used to define a traffic class, as well as the use of hierarchical classification structures to associate traffic classes to data flows. In one embodiment, bandwidth management device 30 includes functionality allowing for classification of network traffic based on information from layers 2 to 7 of the OSI reference model.

In one embodiment, bandwidth management device 30 is configured to include a predefined set of traffic classes based upon a knowledge base gleaned from observation of common or known traffic types on current networks. Bandwidth management device 30, in one embodiment, also allows an administrator to manually create a traffic class by specifying a set of matching attributes. Administrator interface 150, in one embodiment, allows for selection of a traffic class and the configuration of bandwidth utilization (e.g., partition, policy, etc.) and/or other controls/policies (e.g., redirection, security, access control, etc.) for the selected traffic class. Administrator interface 150, in one embodiment, also allows for the selection and arrangement of traffic classes into hierarchical reference trees.

Traffic classification database 137 stores traffic classes associated with data flows that traverse access link 21. Traffic classification database 137, in one embodiment, stores the traffic classes and corresponding data (e.g., matching rules, policies, partition pointers, etc.) related to each traffic class in a hierarchical tree. This tree is organized to show parent-child relationships that is, a particular traffic class may have one or more subordinate child traffic classes with more specific characteristics (matching rules) than the parent class. For example, at one level a traffic class may be configured to define a particular user group or subnet, while additional child traffic classes can be configured to identify specific application traffic associated with the user group or subnet.

In one embodiment, the root traffic classifications are "/inbound/" and "/outbound/" data flows. Any data flow not explicitly classified is classified as "/inbound/default/" or "/outbound/default/". In one embodiment, administrator interface 150 displays the traffic class tree and allows for selection of a traffic class and the configuration of bandwidth utilization controls for that traffic class, such as a partition, a policy, or a combination thereof. Administrator interface 150 also allows for the arrangement of traffic classes into a hierarchical classification tree. Bandwidth management device 30 further allows an administrator to manually create a traffic class by specifying a set of matching rules and, as discussed below, also automatically creates traffic classes by monitoring network traffic across access link 21 and classifying data flows according to a set of criteria to create matching rules for each traffic type. In one embodiment, each traffic class node includes a traffic class identifier; at least one traffic class (matching) attribute; at least one policy parameter (e.g., a bandwidth utilization control parameter, a security policy parameter, etc.), a pointer field reserved for pointers to one to a plurality of child traffic classes. In one embodiment, traffic classification database 137 implements a reference tree classification model wherein separate traffic classification trees can be embedded in traffic class nodes of a given traffic classification tree. U.S. application Ser. No. 10/236,149, incorporated by reference herein, discloses the use and implementation of embeddable reference trees.

B.3.a. Traffic Type Identification and Automatic Traffic Classification

In one embodiment, bandwidth management device 30 further comprises a traffic discovery engine (not shown), which is operative to apply predefined sets of matching criteria to identify a traffic type associated with data flows traversing bandwidth management device 30. In one embodiment, the traffic discovery engine creates traffic classes automatically in response to data flows traversing bandwidth management device 30 and stores such traffic classes in traffic classification engine 137. Automatic traffic classification is disclosed in U.S. Pat. No. 6,412,000, which is incorporated herein by reference. In one embodiment, the traffic discovery engine must detect a minimum number of data flows within a predefined period for a given traffic type before it creates a traffic class in traffic classification engine 137. In one embodiment, such discovered traffic classes are, by default, attached to or associated with a shared "auto-discovered" reference tree, as appropriate. As discussed below, administrator interface 150 allows for configuration of bandwidth controls for auto-discovered traffic classes. In one embodiment, auto-discovered traffic classes are automatically assigned predefined or default bandwidth utilization controls. U.S. patent application Ser. No. 09/198,051, incorporated by reference herein, discloses automatic assignment of bandwidth utilization controls for discovered traffic classes.

The traffic discovery engine, in one embodiment, is supported by one to a plurality of traffic identification tables in a relational database that allow for identification of a traffic type (e.g., application, service, protocol, etc.) based on the attributes of a particular data flow. In one embodiment, the traffic discovery engine includes a services table including the following fields: 1) service ID, 2) service aggregate (if any), 3) name of service, 4) service attributes (e.g., port number, outside IP address, etc.), and 5) default bandwidth management policy. A service aggregate encompasses a combination of individual services (each including different matching criteria, such as different port numbers, etc.) corresponding to the service aggregate. When bandwidth management device 30 encounters a new flow, the traffic discovery engine analyzes the control block object associated with the data flow against the service attributes in the services table to identify a service ID corresponding to the flow. In one embodiment, the traffic discovery engine may identify more than one service ID associated with the flow. In this instance, traffic discovery engine associates the more/most specific service ID to the flow. For example, network traffic associated with a peer-to-peer file sharing service may be identified as TCP or HTTP traffic, as well as higher level traffic types such as the actual file sharing application itself (e.g., Napster, Morpheus, etc.). In this instance, the traffic discovery engine associates the flow with the most specific service ID.

As discussed above, if the traffic discovery engine identifies a threshold number of flows for a given service for which no traffic class has been configured, it will create a traffic class corresponding to the service type in the traffic classification configuration hierarchy maintained in traffic classification engine 137. In one embodiment, the traffic discovery engine constructs a set of matching rules based on the corresponding service attributes in the services table (and/or other tables associated with the service ID) and stores them in association with a traffic class identification. In one embodiment, the traffic discovery engine further stores the default bandwidth management policy associated with the service ID in association with the traffic class node. In one embodiment, administrator interface 150 allows a user to select a discovered traffic class node, and add it to another location in the existing traffic classification tree.

B.4. Enforcement of Bandwidth Utilization Controls

Figure 4:
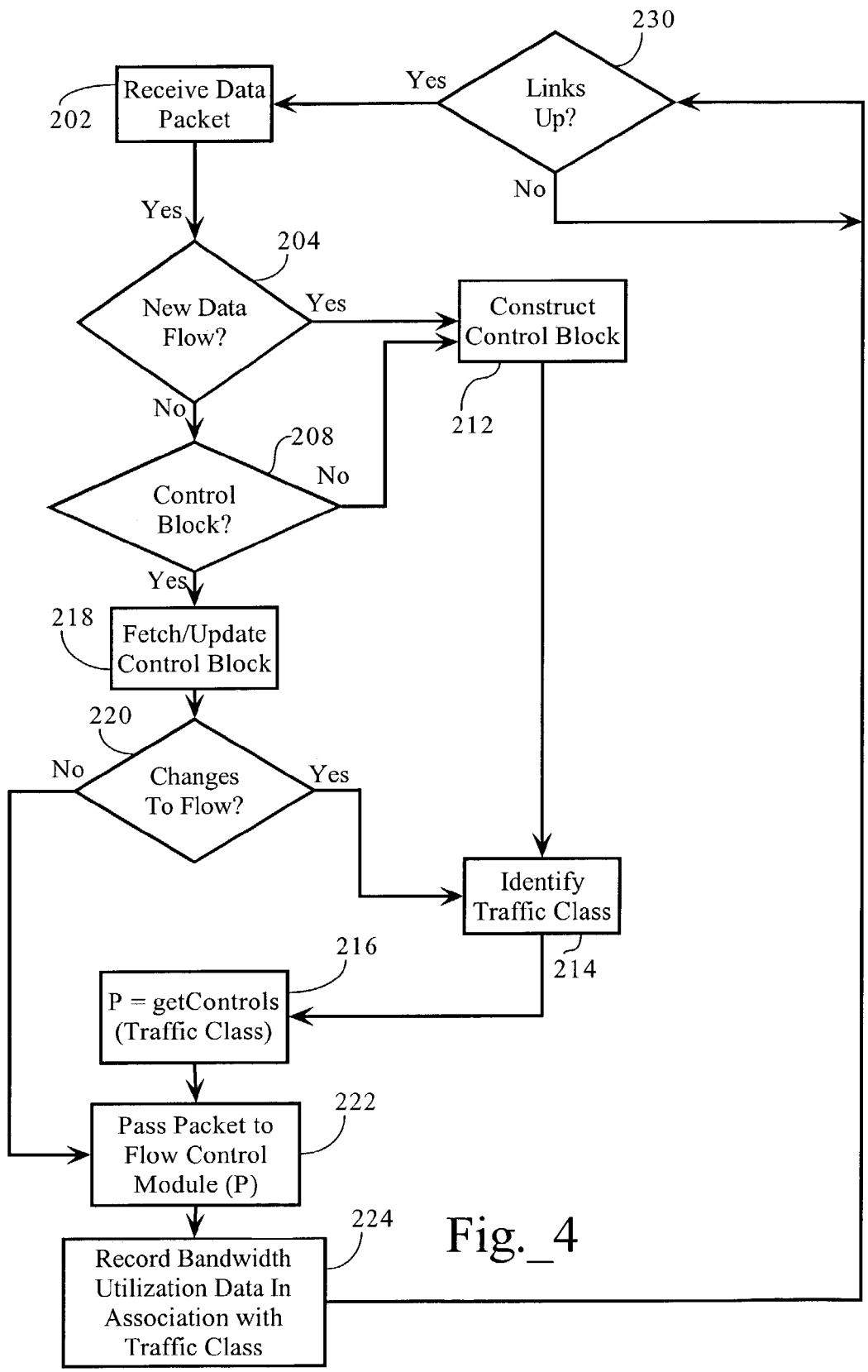
FIG. 4 is a flow chart providing a method directed to processing data packets to allow for enforcement of bandwidth utilization and other controls on network data flows.

FIG. 4 illustrates a method, according to one embodiment, directed to the enforcement of bandwidth utilization controls on data flows transmitted across access link 21 and, therefore, traversing bandwidth management device 30. The method for enforcing bandwidth utilization controls, however, is not critical to the present invention; any suitable method can be employed. In one embodiment, packet processor 131 receives a data packet (FIG. 4, 202) and determines whether the packet is part of a new data flow (204) or represents a change to an existing data flow (see 218 and 220). Methods for determining new data flows and assigning packets to existing data flows are well known in the art and also depend on the particular transport layer protocol employed. For a TCP packet, packet processor 131 can determine a new data flow by detecting SYN and/or SYN/ACK packets. However, a new data flow can simply be a data flow for which there is no corresponding control block object in flow database 135. In some embodiments, packet processor 131 may have to encounter multiple packets to identify and fully characterize a new data flow (e.g., identify a service type, traffic class, etc.). For example, U.S. Pat. No. 6,046,980, identified above, discloses methods for classifying packet network flows.

If the packet is a new data flow, packet processor 131 constructs a control block object including attributes characterizing the data flow, such as service type, etc. (212) (see above). Otherwise, packet processor 131 determines whether flow database 135 contains an existing control block object corresponding to the data flow (208) (see Section B.1., supra). If so, packet processor 131 retrieves the control block object, updates various attributes (e.g., last packet time, etc.), and associates the packet with the control block object (218). If flow database 135 does not contain a control block object associated with the new data flow, packet processor 131 constructs a control block object as discussed herein (212). In one embodiment, packet processor 131 analyzes the source and destination IP addresses in the packet header and scans host database 134 for matching entries. If no matching entries exist, packet processor 131 creates new entries for the source and destination IP addresses. As discussed above, in one embodiment, a control block object contains a flow specification object including such attributes as pointers to the "inside" and "outside" IP addresses in host database 134, as well as other flow specification parameters, such as inside and outside port numbers, service type, protocol type, pointers to variable-length information in the dynamic memory pool, and other parameters characterizing the data flow.

If the packet corresponds to an existing data flow, packet processor 131 retrieves the control block object and updates attributes of the control block object and/or flow specification object as appropriate (218). If elements of the data packet represent a change to the traffic type associated with the data flow (220), packet processor 131 passes the flow specification object to traffic classification engine 137 to identify a traffic class corresponding to the flow (214). Methods for determining changes to data flows are also well known in the art. For example, an email may include an attached digital image file. Accordingly, while the initial packets in the data flow may include simple text data, subsequent packets may contain image data. Packet processor 131, in one embodiment, is operative to detect such changes in the characteristics of the data flow by examining data encapsulated in upper layers of each packet, such as the detection of MIME types, etc.

As discussed above, to identify a traffic class associated with the data flow, packet processor 131 passes the control block object (or a pointer to the control block object) to traffic classification engine 137. In one embodiment, the control block object or a copy of it is stored in association with the packet and in the same buffer structure to facilitate access to the control block object by traffic classification engine 137. As discussed in more detail below, traffic classification engine 137 operates on attributes of the control block object and/or flow specification object to identify traffic class(es) associated with the data flow (214). In one embodiment, the control block object in flow database 135 includes a pointer to the identified traffic class(es) in traffic classification engine 137. In one embodiment, the traffic classification engine 137 stores in the control block object the policy parameters (e.g., bandwidth utilization control parameters, security policies, etc.) associated with the identified traffic classes.

Rate control module 132 then accesses the control block object corresponding to the data flow to retrieve the bandwidth utilization or other controls (e.g., partition, policy, security controls, etc.) associated with the traffic class (216) and enforces the bandwidth utilization controls on the data packet flow (222). As discussed above, the particular packet flow control mechanism employed is not critical to the present invention. A variety of flow control technologies can be used, such as the flow control technologies disclosed in co-pending and commonly owned application Ser. No. 10/108,085, incorporated herein by reference above, as well as other rate control technologies. In addition, measurement engine 140 records data associated with the packet (224) to allow for analysis of bandwidth utilization and other network statistics on a traffic class, access link, and/or partition level.

As FIG. 4 illustrates, bandwidth management device 30 as part of the process flow checks the link state attributes to determine whether both links are up (230). If so, packet processing and data flow control operations continue. However, in one embodiment, if either link is down, bandwidth management device waits until both become operational. In one embodiment, bandwidth management device 30 can perform other operations in response to a downed link, such as flushing its partition queues, memory caches and buffers, and other data structures. In addition, as discussed above, in one embodiment, the network interface opposite the interface on which a link failure was detected can be physically shutdown. In another embodiment, the opposite interface can be configured to ignore the packets received on that interface and record various network metrics and statistics, while in this mode.

C. Alternative Embodiments

Figure 6:
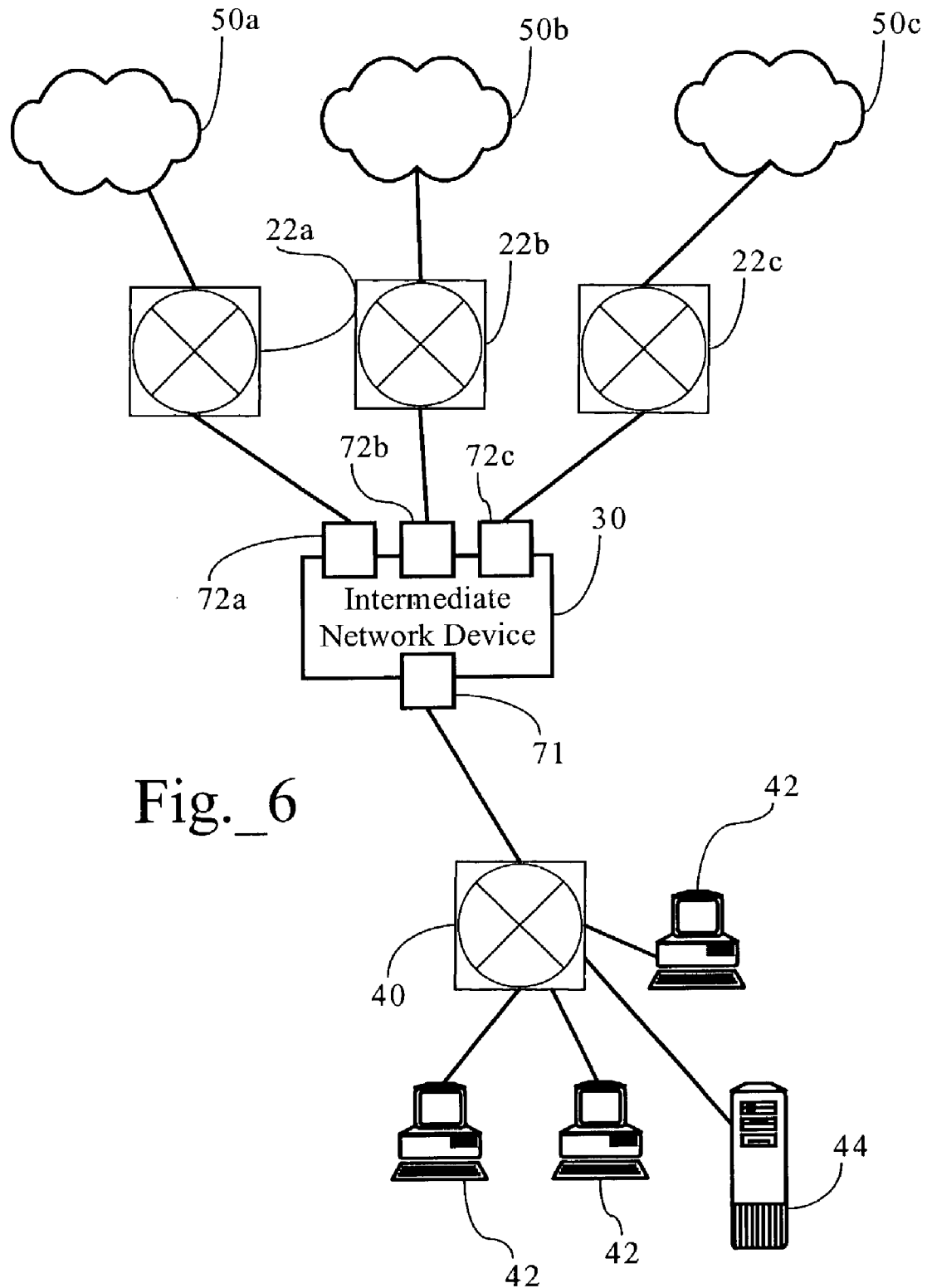
FIG. 6 is a functional block diagram illustrating application of the present invention to an intermediate network device having a multiple interfaces.

As FIG. 6 shows, in one embodiment, intermediate network device 30 can be configured to include multiple interfaces 72a, 72b, 72c operably connected to, for example, network devices 22a, 22b, and 22c, and include routing functionality where the traffic classification associated with a data flow arriving at interface 71 also determines the egress interface 72a, 72b, and 72c. Accordingly, the flow control parameters associated with the traffic class include link identifiers corresponding to a given interface 72a, 72b, or 72c. For example, bandwidth management device 30 may be configured to direct outbound HTTP flows to interface 72a, outbound FTP flows to interface 72b, and outbound SMTP flows to interface 72c. Of course, myriad configurations are possible.

Figure 7:
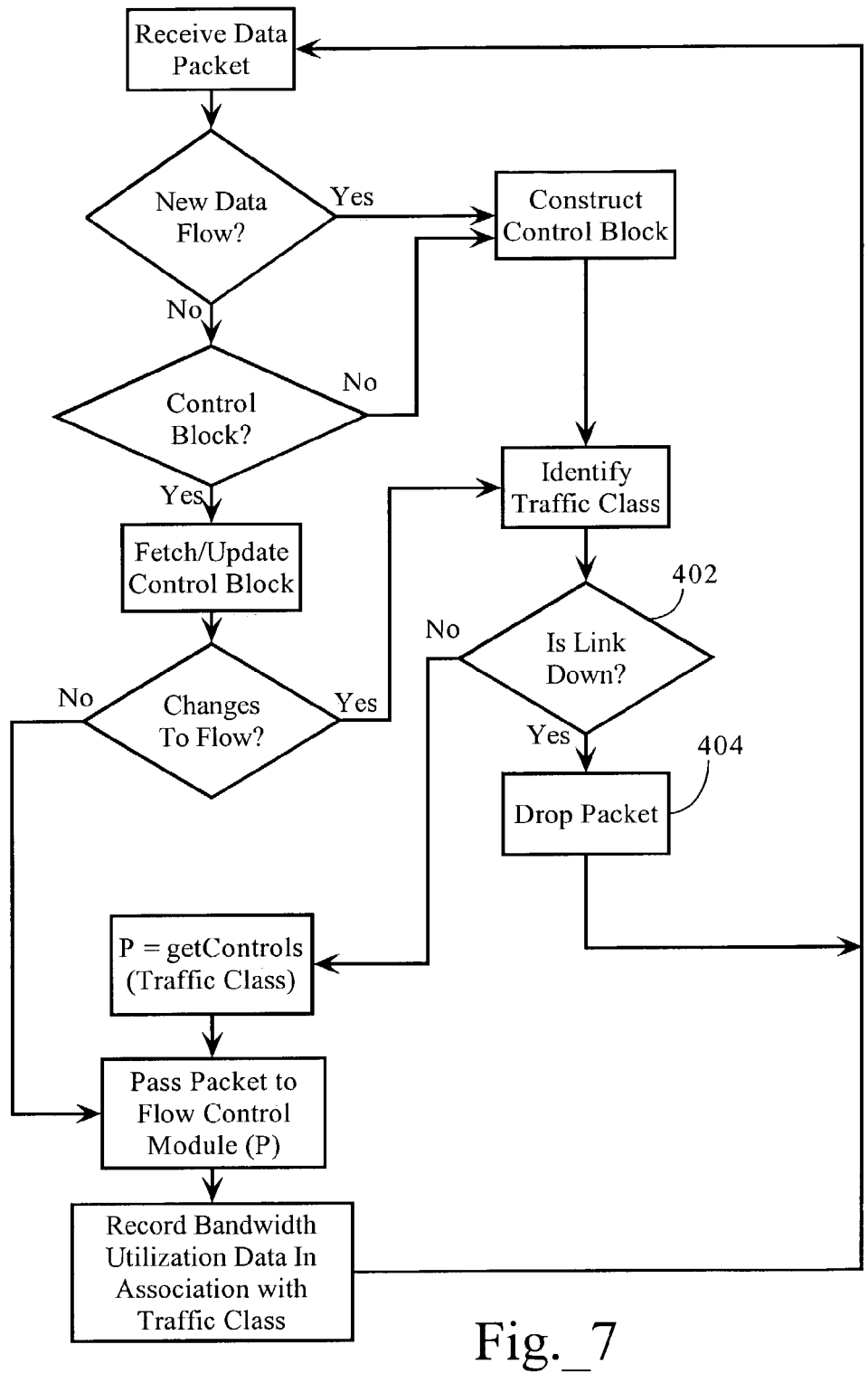
FIG. 7 is a flow chart diagram setting forth a method according to an embodiment of the present invention.

In one embodiment, each link or interface includes a corresponding link object including a link status attribute. When the link status demon is invoked in response to the failure of a given link associated with network device 22a, 22b, or 22c, it responds by changing the link status attribute, as described above. As FIG. 7 illustrates, in one embodiment, packet processor 131, after the traffic classification of a given data flow has been resolved, is extended to check the link status attribute of the link associated with a given data flow (402). If the link is down, packet processor 131 drops the packet (404). Otherwise, the packet is passed to flow control module 132 which applies bandwidth utilization controls, if any, and transmits the packet via an egress interface 72a, 72b or 72c corresponding to the traffic class associated with the flow.

Other link state mirroring operations are possible. For example, if interface 72a goes down, the intermediate network device 30 may be configured to mirror that link state on one to a plurality of other network interfaces to which it has access. For example, in response to a failure detected at network interface 72a, intermediate network device can physically bring down interface 71 and interface 72b. In addition, intermediate network device 30, in response to a detected failure of network interface 72c, for example, may, in software, drop packets corresponding to interface 72c and, for example, network interface 72a.

Lastly, although the present invention has been described as operating in connection with end systems and proxies employing the HTTP, TCP and IP protocols, the present invention has application in computer network environments employing any suitable session layer, transport layer and network layer protocols. Moreover, while embodiments of the present invention have been described as operating in connection with bandwidth management devices, the present invention can also operate in connection with other network devices (such as routers, proxies and firewalls) performing a variety of network functions. Accordingly, the present invention has been described with reference to specific embodiments. Other embodiments of the present invention will be apparent to one of ordinary skill in the art. It is, therefore, intended that the claims set forth below not be limited to the embodiments described above.

What is claimed is:

1. An apparatus comprising
    a first network interface for communication with a first network device;
    a second network interface for communication with a second network device; and
    a control module operative to
        detect, at the first network interface, a link failure corresponding to a link between the first network interface and a first network device; and
        responsive to the detected link failure, functionally disable the second network interface to simulate to the second network device the link failure between the first network interface and the first network device.

2. The apparatus of claim 1 wherein the first network interface is a wired network interface.

3. The apparatus of claim 1 wherein the first network interface is a wireless network interface.

4. The apparatus of claim 1 wherein the control module comprises a link state demon operative to
    detect a link failure at the first or second network interface, and
    in response to a detected link failure at the first network interface, change the configuration of the second network interface to functionally disable the second network interface.

5. The apparatus of claim 1 wherein the control module is operative to physically bring down the second network interface in response to a detected link failure on the first network interface.

6. The apparatus of claim 1 wherein the control module is operative to ignore packets received at the second network interface in response to a detected link failure on the first network interface.

7. The apparatus of claim 1 wherein the first network device is a router.

8. The apparatus of claim 7 wherein the second network device is a switch.

9. In an intermediate network device comprising a first network interface connected to a first remote system, and a second network interface connected to a second remote system, a method comprising
    detecting, at the first network interface of the intermediate network device, a link failure to the first remote system; and
    responsive to the detected link failure, functionally disabling the second network interface of the intermediate network device, to simulate the link failure to the second remote system operably connected to the second network interface.

10. The method of claim 9 wherein the first network interface is a wired network interface.

11. The method of claim 9 wherein the first network interface is a wireless network interface.

12. The method of claim 9 wherein the functionally disabling step comprises bringing down the second network interface in response to a detected failure of the link to the first remote system.

13. The method of claim 9 wherein the functionally disabling step comprises ignoring messages received at the second network interface in response to a detected failure of the link to the first remote system.

14. A bandwidth management device operative to serve as an intermediate network device, comprising
    a first network interface for communication with a first network device;
    a second network interface for communication of data with a second network device;
    a bandwidth management module operably connected to the first and second network interfaces, wherein the bandwidth management module is operative to
        receive data flows at the first and second network interfaces,
        associate traffic types to the data flows, and
        enforce bandwidth utilization controls on the data flows associated with corresponding traffic types; and
    a link state demon operative to
        detect, at the first network interface, an intercommunication failure between the first network interface and a first network device; and
        change the configuration of the bandwidth management module to functionally disable the second network interface, to simulate the failure of the link between the first network interface and the first network device.

15. The bandwidth management device of claim 14 wherein the bandwidth management module is operative to maintain an interface status attribute for each of the first and second network interfaces, and wherein the link failure demon is operative to change the interface status attributes associated with the first and second network interfaces in response to detected intercommunication failures in the first interface.

16. The bandwidth management device of claim 15 wherein the bandwidth management module is responsive to changes in the interface status attributes.

17. The bandwidth management device of claim 14 wherein the link state demon is operative to bring down the second network interface in response to a detected failure of the link associated with the first network interface.

18. The bandwidth management device of claim 14 wherein the link state demon is operative to change the configuration of the bandwidth management module to ignore packets received at the second network interface in response to a detected link failure on the first network interface.

19. An intermediate network device operative to initiate a response to communication failures detected on a network interface, comprising
    an inside network interface for communication with a network device,
    at least two outside network interfaces, each for communication with the network device,
    a control module operative to:
        receive data flows at the inside interface, associate a traffic type to the data flows, distribute the data flows to one of the at least two outside network interfaces based on the associated traffic type, detect failures of the at least two outside interfaces, and functionally disable the inside network interface relative to a select outside interface by ignoring data flows received at the inside interface corresponding to the select outside network interface in response to a inter-communication failure detected at the select outside network interface of the at least two outside interfaces.

20. The apparatus of claim 5 wherein the control module is operative to physically shut down the hardware of the second network interface in response to the detected link failure at the first network interface.

* * * * *